May 19, 1925.
C. A. HAGBERG
1,538,852
ADJUSTABLE LOCKING DEVICE FOR STEERING WHEELS
Filed Jan. 30, 1922   2 Sheets-Sheet 1
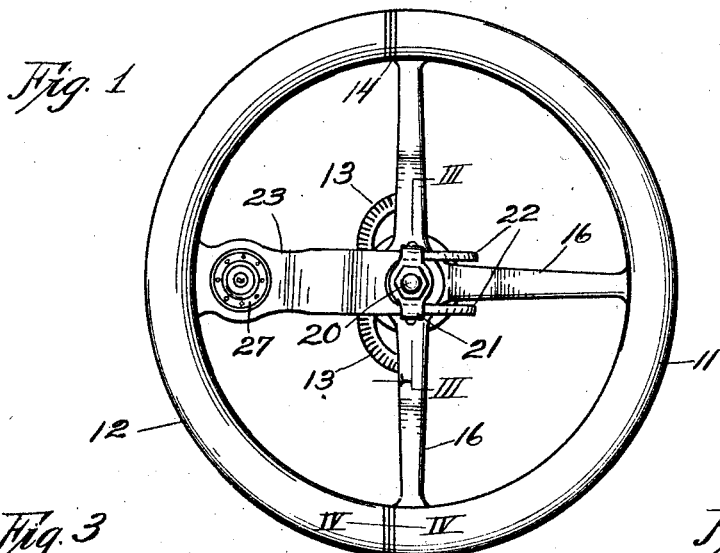
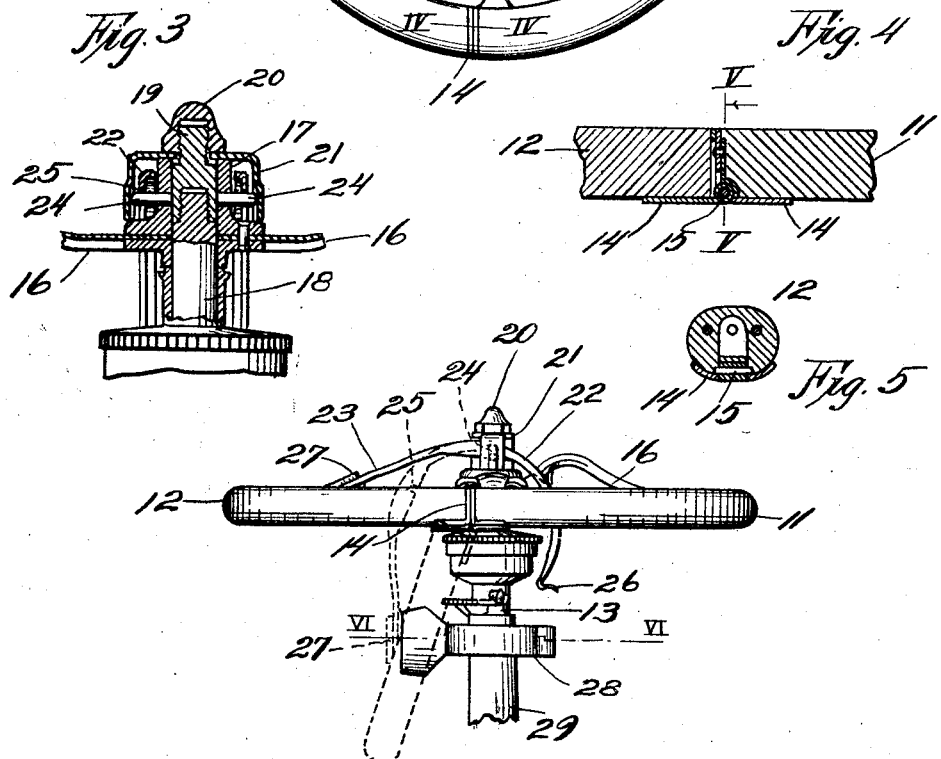

May 19, 1925.  1,538,852
C. A. HAGBERG
ADJUSTABLE LOCKING DEVICE FOR STEERING WHEELS
Filed Jan. 30, 1922  2 Sheets-Sheet 2
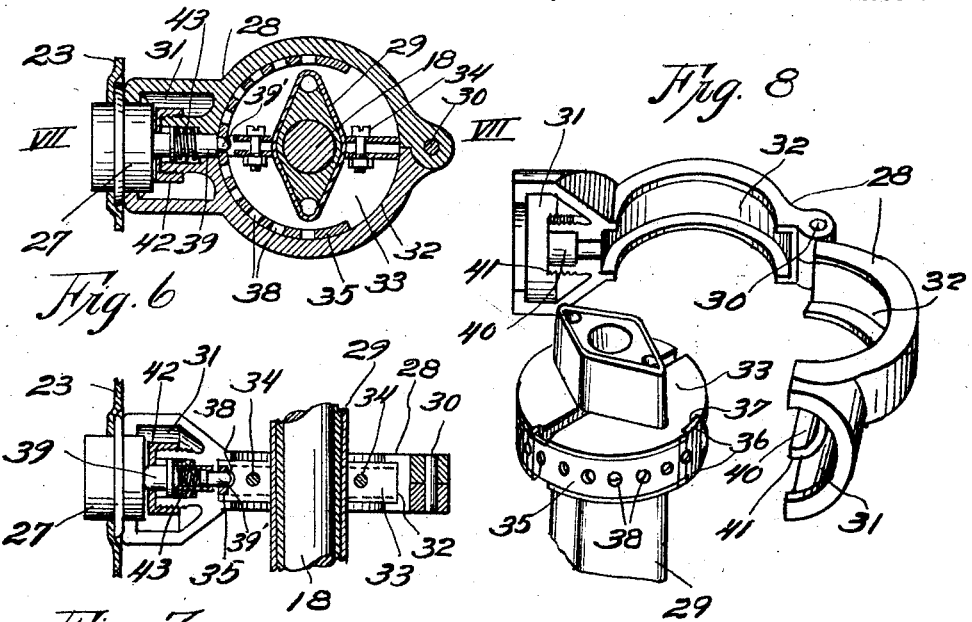
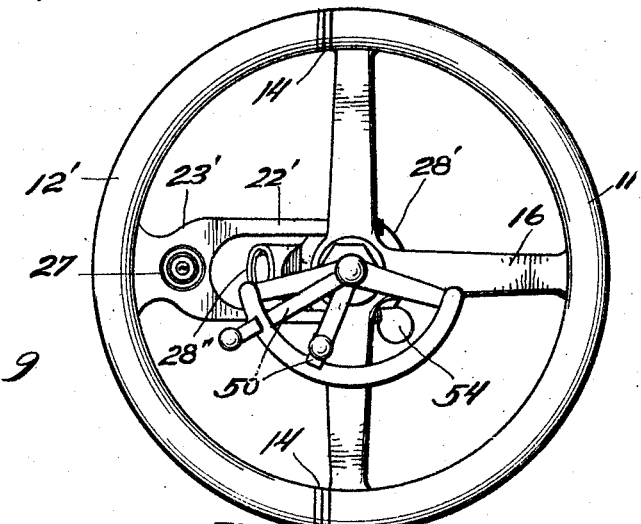
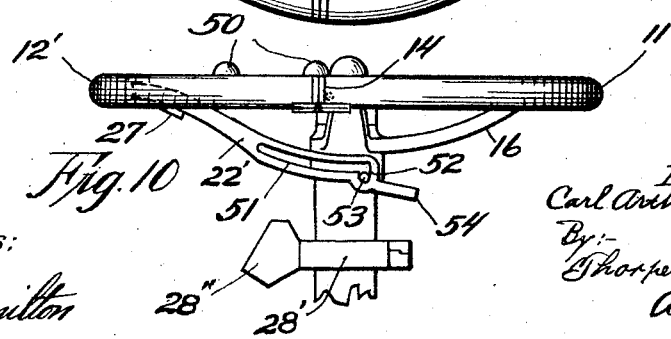
Inventor,
Carl Arthur Hagberg
By:— Thorpe & Gerard,
Attorneys.
Witness:
R. C. Hamilton Patented May 19, 1925.

1,538,852

UNITED STATES PATENT OFFICE.

CARL ARTHUR HAGBERG, OF WICHITA, KANSAS, ASSIGNOR TO FOLD-O.-LOCK STEERING WHEEL MFG. CORPORATION, OF WICHITA, KANSAS, A CORPORATION OF KANSAS.

ADJUSTABLE LOCKING DEVICE FOR STEERING WHEELS.

Application filed January 30, 1922. Serial No. 532,886.

*To all whom it may concern:*

Be it known that I, CARL ARTHUR HAGBERG, a citizen of the United States, and resident of Wichita, county of Sedgwick, State of Kansas, have invented a certain new and useful Improvement in Adjustable Locking Devices for Steering Wheels, of which the following is a complete specification.

The present invention relates to locking devices for the steering gear of automobiles, and aims to provide an improved locking mechanism whereby such steering gear may be effectively locked regardless of the particular position occupied by the parts of the steering gear.

To this end, I have devised a combined steering wheel and lock structure in which the wheel is formed with a movable segment having a lock element adapted to be securely locked to the steering column, in whatever position the wheel may be set relative to the axis of the steering shaft. For effecting this locking function in the various positions of the wheel, I provide the steering column with a movable locking member adapted to assume any position required for cooperating with the lock element of the wheel and to be securely clamped to the steering column against any further movement after the parts of the lock have once become engaged for the purpose of locking the wheel.

It is also sought to provide a construction of the character described which is adapted to various forms of steering gear, including those in which the control levers are located either above or below the wheel, and to embody the features of improvement in a device of neat, attractive and inexpensive design.

With these various general objects in view, as well as minor objects as will appear in the course of the detail description, the invention will now be described with reference to the accompanying drawings illustrating practical and efficient forms of embodiment of the improvements, after which those features which I deem to be novel will be particularly set forth and claimed.

In the drawings—

Figure 1 is a plan view of a steering wheel provided with locking means constructed in accordance with the present invention;

Figure 2 is a side elevation of the same, with broken lines illustrating the locked position of the movable wheel segment;

Figures 3 and 4 are enlarged detail sectional views taken on the lines III—III and IV—IV, respectively, of Figure 1;

Figure 5 is an enlarged detail section taken on the line V—V of Figure 4;

Figure 6 is an enlarged detail section taken on the line VI—VI of Figure 2;

Figure 7 is a section taken on the line VII—VII of Figure 6;

Figure 8 is a perspective view of the parts appearing in Figures 6 and 7, with the rotatable locking member shown open and detached from the fixed element on the steering column;

Figure 9 is a plan view of a modified form of steering wheel with the improved locking means adapted for such modified construction; and Figure 10 is a side elevation of the form of construction illustrated in Figure 9.

Referring now to the drawings in detail, these illustrate in Figures 1 to 3 a form of steering wheel such as used on the Ford type of automobile, in which the control levers (not shown) are mounted for operation along brackets 13 beneath the wheel. This wheel is comprised of a main segment 11 and a movable or hinged segment 12, connected together by means of hinge elements 14 so mounted as to enclose and conceal the hinge pins 15 and protect the same from access by one whose object would be to separate the hinge connections (see Figures 4 and 5). The spider arms 16 of the wheel segment 11 are secured to a central hub member 17 mounted upon the upper end of the steering shaft 18, to which is attached a short extension 19 receiving a cap nut 20 holding in place a metal keeper 21 which forms passages for the fork portions 22 of the spring spider arms 23 of the wheel segment 12. The hub member 17 carries oppositely projecting pins 24 adapted for latching engagement with recesses 25 in the fork portions 22 of the arm 23, for retaining the segments 11 and 12 in coplaner relation, in the normal steering operation of the wheel. The extremities of the fork portions 22 of the arm 23 are connected by a finger engaging portion 26 (see Figure 2), for convenient manipulation in the unlatching of the arm 23 and segment 12, preliminary to the lowering of the latter into position for locking the same as represented in Figure 2.

The arm 23 of the wheel segment 12 is provided with a key-operated lock member 27, adapted for locking operation in connection with a companion locking element 28 (forming a socket for the member 27) carried by the steering column 29, whenever the movable segment 12 is lowered into locking position. This operation is, in general, similar to that illustrated and described in Patent No. 1,238,598, issued August 28, 1917, but the construction set forth in said patent is subject to the objection that the locking function is possible for only one position of the steering gear as determined by the fixed position of the locking device carried by the steering column. The present improvement is concerned chiefly with the overcoming of this objection, by making the locking construction operative for any of the relative positions of the steering wheel and column.

Accordingly, the improved locking member 28 is formed as a split collar with its sections pivotally connected by a pin 30 at one side of the steering column 29 (see Figures 6 and 7), and conjointly forming a socket 31 at the other side of said column for receiving the locking element 27 and coacting therewith to effect the locking function. The collar 28 is internally channeled to form an annular groove 32 for the rotatable mounting of the collar upon a split circular bracket 33 having attaching screws 34 whereby the sections of said brackets may be securely clamped in fixed position to the opposite sides of the steering column 30, as clearly illustrated in Figure 6. Within the periphery of this bracket is mounted a ring segment 35 having terminal lugs 36 engaging recesses 37 of the bracket for retaining the ring segment against any circumferential movement. The ring segment 34 is provided with a plurality of openings 38 covering the range of possible movement of the steering wheel in the steering operation thereof, and designed to be engaged by a spring-actuated detent 39' carried by the inner end of a plunger pin 39 operating in mating grooves 40 formed in internal projections 41 from the collar sections 28. These projections 41 conjointly form an internal boss which is threaded to receive a nut or collar 42 designed to retain the split collar 28 in position upon the bracket 33. The collar 42 is also provided with an opening for affording passage of the plunger 39 and permitting engagement of the outer end thereof with the locking member 27, whereby the plunger is actuated inwardly to permit engagement of its detent 39' with the openings 38 of the ring segment 35. On disengagement of the locking member 27 from the plunger 39, the latter and its detent are retracted from the openings 38 by the action of a coil spring 43 positioned within the mating grooves 40. The provision of the spring-actuated detent 39' allows the plunger 39 to be actuated inwardly even though the detent is not in register with an opening 38, whereupon the detent will immediately snap into one of the openings as soon as the collar 28 is partly turned.

The operation of the improved construction will now be readily understood, as at any time it is only necessary to unlatch the arm 23 by lifting on the finger extension 26 to disengage the notches or recesses 25 from the pins 24 and let the segment 12 of the steering wheel down to bring the locking member 27 into engagement with the locking member or collar 28. Meanwhile the plunger 39 is free of the openings 38 because of the action of its spring 43, so that the collar 28 may be rotated into any position necessary for accomplishing the locking function, regardless of the point to which the steering wheel may have been turned about the axis of the steering shaft. The collar 28 having been turned to register its socket 31 with the locking member 27, the latter is pressed into said socket to "snap" the lock parts into locking engagement, which operation simultaneously actuates the plunger 39 so as to permit of its detent 39' engaging with one of the openings 38, corresponding to the position of the collar 28, thereby fixedly securing the collar, and hence all the parts connected thereto, against any movement about the axis of the steering column. The unlocking operation is even more simple, requiring merely the use of the proper key to release the lock member 27 from the collar 28 and swinging the movable wheel segment 12 up into original position, in which position it is automatically latched by the arms 22 swinging into engagement with the pins 24, and the collar 28 is likewise automatically freed for rotative movement by the release of the plunger 39 to the action of its spring 43.

In Figures 9 and 10 is shown a modified arrangement of the improvement to adapt the same for a steering wheel structure in which the wheel is located below the position of the control levers 50. This necessitates simply the modification of the lock-socket portion 28" of the collar 28' to present its open face at a slight upward ankle to accomodate the more restricted range of movement of the movable segment 12' of the steering wheel, which segment cannot be swung sufficiently to bring its lock-carrying arm 23' into vertical position as in the other form of steering gear. A different arrangement is also required for the fork portions 22' of the arm 23' carrying the lock member 27, due to the lower position of the wheel, these fork portions being provided with slots 51 having notches 52 for engagement with pins 53, whereby the segment 12' is latched in normal operative position. One of said fork portions 22' is formed with a finger engaging element 54 for manual operation in the disengagement of the notches 52 from the pins 53 preparatory to the locking operation of the wheels, which is in all respects similar to the operation already described in connection with the first form of construction.

It will thus be apparent that I have devised a very practical, compact and efficient arrangement and construction for fulfilling the desired objects of the invention, and while I have illustrated what now appear to constitute the preferred modes of embodiment of the same, I desire to expressly reserve the right to make such changes or modifications as may fairly fall within the scope of the appended claims.

What I claim is:

1. Locking means for steering gear comprising, in combination with a fixed steering column, a steering wheel formed with a movable segment, a locking element carried by said movable segment, and a companion locking element carried by said steering column and movable into different positions about the axis of said column, thereby adapting said companion element for locking engagement with the element carried by said movable segment regardless of the position of said wheel with reference to the axis of said steering column.

2. Locking means for steering gear comprising, in combination with a fixed steering column, a steering wheel formed with a movable segment, a locking element carried by said movable segment, and a companion locking element carried by said steering column and rotatable about the axis thereof, and means for fixedly securing said companion locking element to said column and in locking engagement with the element carried by said movable segment in any of the various positions assumed by said wheel with reference to the axis of said column.

3. Locking means for steering gear comprising, in combination with a fixed steering column, a steering wheel formed with a movable segment, and locking elements carried by said segment and column, respectively, and adapted for locking engagement with each other, the locking element carried by said column being movable about the axis of said column, and means automatically actuated by the locking engagement of said elements for simultaneously securing the locking element carried by said column in fixed relation thereto.

4. Locking means for steering gear comprising, in combination with a fixed steering column, a steering wheel formed with a movable segment, locking elements carried by said segment and column, respectively, and adapted to effect locking interengagement in any of the positions adapted to be assumed by said wheel, and means actuated by the locking engagement of said elements for retaining the same in fixed relation to said steering column.

5. Locking means for steering gear comprising, in combination with a fixed steering column, a steering wheel formed with a movable segment, a locking element carried by said movable segment, a companion locking element rotatably mounted upon said steering column and adapted for cooperation with said first element in any position of said wheel, and means actuated by the locking engagement of said elements for securing the said companion element in fixed relation to said steering column.

6. Locking means for steering gear comprising, in combination with a fixed steering column, a steering wheel formed with a movable segment, a locking element carried by said movable segment, a fixed member secured to said steering column and provided with a plurality of radial openings, and a companion locking element rotatably carried by said fixed member and provided with a plunger for engagement with said openings, the locking engagement of said locking elements being adapted to actuate said plunger into one or the other of said openings for retaining said companion element in fixed relation to said steering column.

7. Locking means for steering gear comprising, in combination with a fixed steering column, a steering wheel formed with a movable segment, a locking element carried by said movable segment, a fixed member secured to said steering column and carrying a ring segment provided with a plurality of radial openings, a collar rotatably mounted on said fixed member and retaining said ring segment thereon, said collar being formed with a lock portion adapted for locking engagement by said first locking element, and a plunger carried by said collar and actuated by the locking action of said first element into one or the other of said openings in said ring segment to retain said collar in fixed relation to said steering column.

8. Locking means for steering gear comprising, in combination with a fixed steering column, a steering wheel formed with a movable segment, a locking element carried by said movable segment, a fixed member secured to said steering column and carrying a ring segment provided with a plurality of radial openings, a split collar rotatably mounted on said fixed member and formed with a lock-receiving socket for engagement by said first locking element, a nut-collar within said socket adapted to retain said split collar in closed position embracing said ring segment and clamping the latter to said fixed member, and a plunger operable through said nut-collar and adapted to be actuated by the locking action of said first locking element into one or the other of the openings in said ring segment to retain said split collar in fixed relation to said steering column.

9. In a locking means of the character described, a steering wheel composed of a main segment and a relatively movable locking segment, and means for locking said movable segment to the steering column for securing the wheel against rotative movement, said movable segment having an arm provided with latching means for retaining said movable segment normally in coplanar relation to said main segment of the wheel, said latching means being provided with an extension adapted for manual operation in disengaging said latching means for releasing said arm.

In witness whereof I hereunto affix my signature.

CARL ARTHUR HAGBERG.